US011667573B2

(12) United States Patent
Briaud et al.

(10) Patent No.: US 11,667,573 B2
(45) Date of Patent: *Jun. 6, 2023

(54) COMPOSITIONS AND METHOD TO IMPROVE THE STRENGTH DEVELOPMENT OF CALCIUM SILICATE-BASED CEMENTS AND CONCRETES

(71) Applicant: SOLIDIA TECHNOLOGIES, INC., Piscataway, NJ (US)

(72) Inventors: Vincent Briaud, Jona (CH); Frédéric Cervera, Jona (CH); Vincent Meyer, Jona (CH); Sadananda Sahu, Tallahassee, FL (US); Ahmet Cuneyt Tas, Piscataway, NJ (US); Deepak Ravikumar, Piscataway, NJ (US); Jason Elizan Bryant, Easton, PA (US); Anuj Seth, East Brunswick, NJ (US)

(73) Assignee: Solidia Technologies, Inc, San Antonio, TX (US)

( * ) Notice: Subject to any disclaimer, the term of this patent is extended or adjusted under 35 U.S.C. 154(b) by 1166 days.

This patent is subject to a terminal disclaimer.

(21) Appl. No.: 16/198,129

(22) Filed: Nov. 21, 2018

(65) Prior Publication Data

US 2019/0152859 A1 May 23, 2019

Related U.S. Application Data

(60) Provisional application No. 62/589,274, filed on Nov. 21, 2017.

(51) Int. Cl.
| *C04B 28/18* | (2006.01) |
| *C04B 24/12* | (2006.01) |
| *C04B 22/14* | (2006.01) |
| *C04B 40/02* | (2006.01) |
| *B32B 13/04* | (2006.01) |
| *C04B 22/12* | (2006.01) |

(52) U.S. Cl.
CPC .......... *C04B 28/188* (2013.01); *B32B 13/04* (2013.01); *C04B 22/124* (2013.01); *C04B 22/143* (2013.01); *C04B 24/122* (2013.01); *C04B 40/0231* (2013.01); *C04B 2201/52* (2013.01)

(58) Field of Classification Search
CPC ... C04B 14/043; C04B 22/124; C04B 22/143; C04B 24/121; C04B 24/122; C04B 28/188; C04B 40/0231; C04B 2103/65; C04B 2201/52
See application file for complete search history.

(56) References Cited

U.S. PATENT DOCUMENTS

| 6,048,393 A | 4/2000 | Cheung et al. |
| 6,926,851 B2 * | 8/2005 | Colavito ............... F27D 1/1626 249/20 |
| 7,998,267 B2 * | 8/2011 | Gartner ................. C04B 28/065 106/695 |
| 8,114,367 B2 | 2/2012 | Riman et al. |
| 9,221,027 B2 | 12/2015 | Kuppler et al. |
| 2004/0107872 A1 | 6/2004 | Matsuyama et al. |
| 2009/0142578 A1 | 6/2009 | Riman et al. |
| 2009/0143211 A1 | 6/2009 | Riman et al. |
| 2011/0104469 A1 | 5/2011 | Riman et al. |
| 2012/0312194 A1 | 12/2012 | Riman et al. |
| 2013/0122267 A1 | 5/2013 | Riman et al. |
| 2014/0093659 A1 | 4/2014 | Riman et al. |
| 2014/0127450 A1 | 5/2014 | Riman et al. |
| 2014/0127458 A1 | 5/2014 | Zambrzycki et al. |
| 2014/0263683 A1 | 9/2014 | Krishnan et al. |
| 2014/0272216 A1 | 9/2014 | Deo et al. |
| 2014/0314990 A1 | 10/2014 | Henn et al. |
| 2014/0342124 A1 | 11/2014 | Zambrzycki et al. |
| 2014/0361471 A1 | 12/2014 | Hu et al. |
| 2014/0363665 A1 | 12/2014 | Kuppler et al. |
| 2015/0056437 A1 | 2/2015 | Deo et al. |
| 2015/0203408 A1 | 7/2015 | Sroka et al. |
| 2015/0225295 A1 | 8/2015 | McCandlish et al. |
| 2015/0266778 A1 | 9/2015 | Riman et al. |
| 2015/0336852 A1 | 11/2015 | Patten et al. |
| 2016/0031757 A1 | 2/2016 | Atakan et al. |
| 2016/0096773 A1 | 4/2016 | Quinn et al. |
| 2016/0168720 A1 | 6/2016 | Jain et al. |
| 2016/0272544 A1 | 9/2016 | Sahu et al. |
| 2016/0272545 A1 | 9/2016 | Atakan et al. |
| 2016/0340261 A1 | 11/2016 | Atakan et al. |
| 2016/0355439 A1 | 12/2016 | McCandlish et al. |

(Continued)

FOREIGN PATENT DOCUMENTS

| CN | 105565850 A * | 5/2016 | ............. C04B 35/14 |
| CN | 105948642 A * | 9/2016 | ............. C04B 28/04 |

(Continued)

OTHER PUBLICATIONS

U.S. Appl. No. 61/708,423, filed Oct. 1, 2012.
International Search Report as issued in International Patent Application No. PCT/EP2018/082115, dated Jan. 28, 2019.

*Primary Examiner* — Anthony J Green

(74) *Attorney, Agent, or Firm* — Dentons US LLP

(57) ABSTRACT

Calcium silicate-based cements and concretes are disclosed, which result in concrete compositions that have an improved strength development. A cement product includes a plurality of particles of a carbonatable calcium silicate cement and a first additive; wherein, the first additive is an organic molecule with at least one primary, secondary or tertiary amine group.

7 Claims, 1 Drawing Sheet

(56) References Cited

U.S. PATENT DOCUMENTS

| | | | |
|---|---|---|---|
| 2017/0102373 A1 | 4/2017 | Atakan et al. | |
| 2017/0121223 A1 | 5/2017 | Atakan | |
| 2017/0204010 A1 | 7/2017 | Atakan | |
| 2017/0253530 A1 | 9/2017 | Sahu et al. | |
| 2017/0260096 A1 | 9/2017 | Sahu et al. | |
| 2017/0320781 A1 | 11/2017 | Atakan et al. | |
| 2017/0341989 A1 | 11/2017 | Jimenez et al. | |
| 2018/0194693 A1 | 7/2018 | Quinn et al. | |
| 2019/0152858 A1* | 5/2019 | Briaud | C04B 24/42 |

FOREIGN PATENT DOCUMENTS

| | | | | |
|---|---|---|---|---|
| CN | 106478020 A * | 3/2017 | | C04B 28/04 |
| EP | 2 105 419 A1 | 9/2009 | | |
| EP | 3109216 A1 * | 12/2016 | | C04B 24/122 |
| JP | 2005-089283 A | 4/2005 | | |
| JP | 2005-187324 A | 7/2005 | | |
| WO | WO 2005/092818 A1 | 10/2005 | | |
| WO | WO 2009/102360 A2 | 8/2009 | | |
| WO | WO 2011/053598 A1 | 5/2011 | | |
| WO | WO 2011/090967 A1 | 7/2011 | | |
| WO | 2016/022485 A1 | 2/2016 | | |

\* cited by examiner

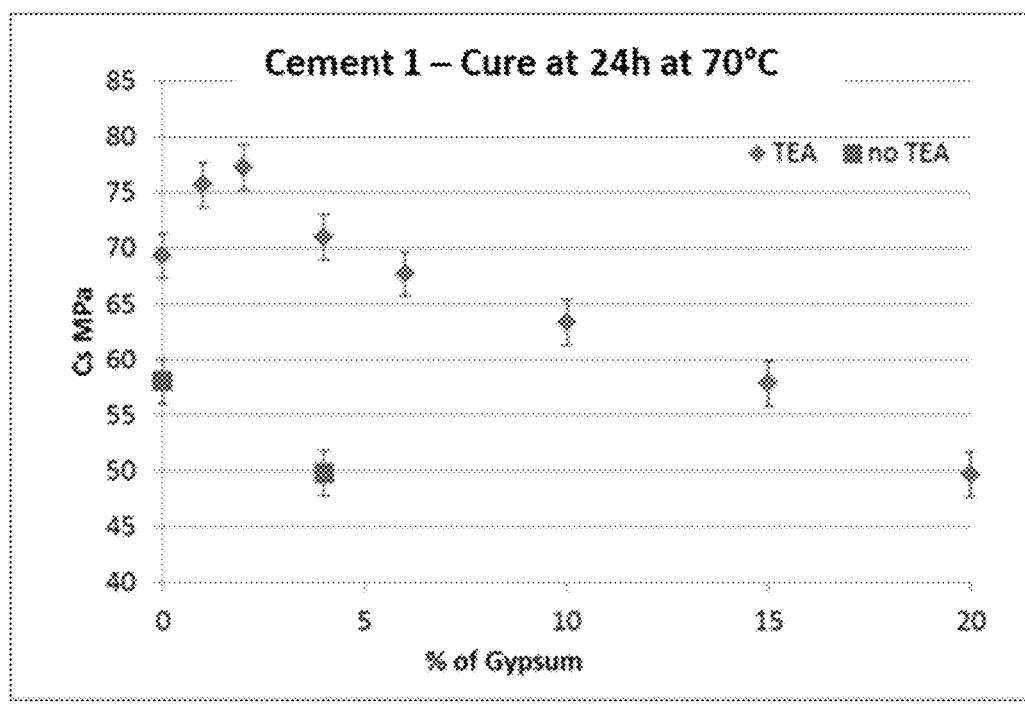

COMPOSITIONS AND METHOD TO IMPROVE THE STRENGTH DEVELOPMENT OF CALCIUM SILICATE-BASED CEMENTS AND CONCRETES

CROSS-REFERENCE TO RELATED APPLICATIONS

This application claims priority to U.S. Provisional Application No. 62/589,274, filed Nov. 21, 2017, the entire content of which is incorporated herein by reference in its entirety.

FIELD

The present invention relates to carbonatable calcium silicate-based cements and concretes, which result in concrete compositions that have an improved strength development.

BACKGROUND

Concrete is the most consumed man-made material in the world. Precast concrete products, such as pavers, blocks, hollow core slabs, roof tiles, aerated concrete blocks, etc., are widely used in construction, pavements and landscaping, to infrastructure and transportation.

A typical concrete product is made by mixing water and aggregates such as sand and crushed stone with Portland cement, a synthetic material made by burning a mixture of ground limestone and clay, or materials of similar composition in a rotary kiln at a sintering temperature of around 1,450° C. Portland cement manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone.

Recently, a revolutionary form of cement that is based on carbonatable calcium silicate materials has emerged as a promising substitute to traditional cement and concrete products. Production of carbonatable calcium silicate-based cements and concrete products involves significantly reduced $CO_2$ emissions and energy consumption. In addition, this new cement sequesters $CO_2$ when cured into concrete products because $CO_2$ is needed to react with the carbonatable calcium silicate materials during the curing process to form concrete products.

However, even with these revolutionary forms of cements, users are always waiting for solutions to improve strength development of concrete products.

BRIEF DESCRIPTION OF THE DRAWINGS

FIG. 1: Effect of gypsum content in the cement composition

This graph shows the preferred gypsum content that corresponds to a binder composed of approximated 97 wt. % of Cement 1 and 3 wt. % gypsum in the presence of TEA.

DETAILED DESCRIPTION

The invention provides novel compositions of carbonatable calcium silicate-based cements and concretes and methods for improving strength development of calcium silicate-based cements and concretes. These improvements are achieved through the use of specific additives, included during the preparation of the cement or the concrete compositions.

In one aspect, the invention relates to the calcium silicate-based cement compositions. These cement compositions comprise a plurality of calcium silicate cement particles, a first additive, and optionally a second additive. The calcium silicate cement of the invention is carbonatable and preferably comprises CaO and $SiO_2$ in a CaO to $SiO_2$ percentage by weight of oxides ratio of from about 0.7 to 1.8, more preferably 0.7 to 1.5, even more preferably of 0.8 to 1.2.

In an embodiment, the calcium silicate cement of the invention comprises from 30 to 55% wt. $SiO_2$; from 40 to 55% wt. CaO relative to the total weight of oxide and optionally further comprises from 1 to 8% wt. $Al_2O_3$; from 0.1 to 5% wt. $Fe_2O_3$; and/or from 0.1 to 2.5% wt. MgO relative to the total weight of oxide. The calcium silicate cement of the invention may optionally further comprise from 0.01 to 10% wt. $SO_3$; from 0.01 to 0.5% wt. $Na_2O$; from 0.1 to 2% wt. $K_2O$; from 0.01 to 0.5% wt. $TiO_2$; from 0.01 to 1% wt. $P_2O_5$; and/or from 0.01 to 0.5% wt. $Mn_2O_3$ relative to the total weight of oxide.

In another aspect, the invention relates to the calcium silicate-based concrete compositions. The concrete compositions comprise a plurality of carbonatable calcium silicate cement particles, a plurality of aggregate particles, a first additive, and optionally a second additive.

In another aspect, the cement of the invention enables to produce a concrete product comprising:
the cement product of the invention, wherein the cement product is cured with a greenhouse gas comprising carbon dioxide to produce a structure comprising of a core, wherein the core comprises of a portion of the unreacted calcium silicate particle;
a silica-rich layer covering at least a portion of the surface of the core; and an exterior layer covering at least a portion of the silica-rich first layer, wherein, the exterior layer comprises calcium carbonate.

In another aspect, the cement of the composition is non-hydraulic.

In yet another aspect, the invention relates to a method to increase strength of calcium silicate-based materials that has the following steps:

1. A first and potentially a second additive are added prior, during or after the grinding of a calcium silicate-based cement.
2. This calcium silicate-based composition is mixed with a plurality of aggregate particles to form a concrete composition.
3. The concrete composition has a plurality of pores and is carbonated using a greenhouse gas that contains carbon dioxide.

According to an alternative method to increase strength of calcium silicate-based materials, the following steps are used:

1. A calcium silicate-based cement is mixed with a plurality of aggregate particles to form a concrete composition.
2. A first and potentially a second additive in powder or liquid form are added prior or during the mixing of the cement and the plurality of aggregate particle.
3. The resulting concrete composition has a plurality of pores and is carbonated using a greenhouse gas that contains carbon dioxide.

In another aspect, the invention relates to a method for preparing a concrete product.

The invention also provides a concrete product comprising:
   the cement product of the invention, wherein the cement product is cured with a greenhouse gas comprising carbon dioxide to produce a structure comprising of a core, wherein the core comprises of a portion of the unreacted calcium silicate particle;
   a silica-rich layer covering at least a portion of the surface of the core;
   an exterior layer covering at least a portion of the silica-rich first layer, wherein, the exterior layer comprises calcium carbonate;
   and a plurality of aggregate particles.

The invention also provides a method for preparing a concrete product comprising:
   mixing the cement according to the invention with a plurality of aggregate particles to form a concrete product having a plurality of pores;
   placing and forming the concrete product in molds;
   curing the formed concrete product with a greenhouse gas comprising carbon dioxide to produce a structure comprising of a core, wherein the core comprises a portion of the unreacted carbonatable calcium silicate particle;
   a silica-rich layer covering at least a portion of the surface of the core; and
   an exterior layer covering at least a portion of the silica-rich first layer, wherein, the exterior layer comprises calcium carbonate.

In another aspect, the invention relates to a carbonatable composition comprising:
   Calcium silicate;
   One or more discrete calcium silicate phases selected from CS (wollastonite or pseudowollastonite), C3S2 (rankinite), C2S (belite, larnite, bredigite), and an amorphous calcium silicate phase at about 30%> or more by mass of the total phases; and
   calcium aluminate accounting for about 0.1% to about 2.5% by weight of the carbonatable composition,
   wherein elemental Ca and elemental Si are present in the composition at a molar ratio from about 0.8 to about 1.2; and metal oxides of Al, Fe and Mg are present in the composition at about 30% or less by mass,
   the first and the second additives, preferably TEA and gypsum.

Precast Objects of Carbonatable Calcium Silicate Cements

The term "calcium silicate" material, as used herein, generally refers to naturally-occurring minerals or synthetic materials that are comprised of one or more of a group of calcium silicate phases. "Carbonatable", as used herein, refers to a material that is reactive with $CO_2$ via a carbonation reaction under a condition disclosed herein. A material is "uncarbonatable" if it is unreactive with $CO_2$ via a carbonation reaction under a condition disclosed herein. Exemplary carbonatable calcium silicate phases include CS (wollastonite or pseudowollastonite, and sometimes formulated $CaSiO_3$ or $CaO \cdot SiO_2$), C3S2 (rankinite, and sometimes formulated as $Ca_3Si_2O_7$ or $3CaO \cdot 2SiO_2$), C2S (belite, $\beta$-$Ca_2SiO_4$ or larnite, $Ca_7Mg(SiO_4)_4$ or bredigite, $\alpha$-$Ca_2SiO_4$ or $\gamma$-$Ca_2SiO_4$, and sometimes formulated as $Ca_2SiO_4$ or $2CaO \cdot SiO_2$). Amorphous phases can also be carbonatable depending on their composition. Each of these materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. Exemplary uncarbonatable or inert phases include melilite ($(Ca,Na,K)_2[(Mg, Fe^{2+},Fe^{3+},Al,Si)_3O_7]$) and crystalline silica ($SiO_2$).

The carbonatable calcium silicate phases included in the calcium silicate composition do not hydrate when exposed to water. Due to this, composites produced using a calcium silicate composition as the binding agent do not generate significant strength when combined with water. The strength generation is controlled by exposure of calcium silicate composition containing composites to specific curing regimes in the presence of $CO_2$.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite") and $Mg_3Si_4O_{10}(OH)_2$ (also known as "talc") and $CaMgSiO_4$ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

In exemplary embodiments, ground calcium silicate composition is used. The ground calcium silicate composition may have a mean particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 1 μm to about 5 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 m²/kg to about 700 m²/kg (e.g., 150 m²/kg, 200 m²/kg, 250 m²/kg, 300 m²/kg, 350 m²/kg, 400 m²/kg, 450 m²/kg, 500 m²/kg, 550 m²/kg, 600 m²/kg, 650 m²/kg, 700 m²/kg).

In exemplary embodiments of carbonation of the calcium silicate composition of the invention, ground calcium silicate particles used have a particle size having a cumulative 10% diameter greater than 1 μm in the volume distribution of the particle size distribution.

Any suitable aggregates may be used to form composite materials from the carbonatable composition of the invention, for example, calcium oxide-containing or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the composite material; for example, plasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

Carbonation of Carbonatable Calcium Silicate Cements

A major utility of the carbonatable composition is that it can be carbonated to form composite materials that are useful in a variety of application.

The following reactions are believed to take place during carbonation of calcium silicate as disclosed herein.

$$CaSiO_3(s)+CO_2(g) \rightarrow CaCO_3(s)+SiO_2(s) \quad (1)$$

$$Ca_3Si_2O_7(s)+3CO_2(g) \rightarrow 3CaCO_3(s)+2SiO_2(s) \quad (2)$$

$$Ca_2SiO_4(s)+2CO_2(g) \rightarrow 2CaCO_3(s)+SiO_2(s) \quad (3)$$

Generally, $CO_2$ is introduced as a gas phase that dissolves into an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from the calcium silicate phases. Calcium may be leached from calcium containing amorphous phases through a similar mechanism. The released calcium cations and the dissociated carbonate species lead to the precipitation of insoluble carbonates. Silica-rich layers are thought to remain on the mineral particles as calcium depleted layers.

The $CaCO_3$ produced from these or any other $CO_2$ carbonation reactions disclosed herein may exist as one or more of several $CaCO_3$ polymorphs (e.g., calcite, aragonite, and vaterite). The $CaCO_3$ particles are preferably in the form of calcite but may also be present as aragonite or vaterite or as a combination of two or three of the polymorphs (e.g., calcite/aragonite, calcite/vaterite, aragonite/vaterite or calcite/aragonite/vaterite).

Any suitable grade of $CO_2$ may be used depending on the desired outcome of carbonation. For example, industrial grade $CO_2$ at about 99% purity may be used, which is commercially available from a variety of different industrial gas companies, such as Praxair, Inc., Linde A G, Air Liquide, and others. The $CO_2$ supply may be held in large pressurized holding tanks in the form of liquid carbon dioxide regulated at a temperature such that it maintains a desired vapor pressure, for example, of approximately 300 PSIG. This gas is then piped to a $CO_2$ curing (carbonation) enclosure or chamber. In the simplest system, $CO_2$ is flowed through the enclosure at a controlled rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so to maintain a concentration of $CO_2$ sufficient to drive the curing reaction.

The carbonation, for example, may be carried out reacting it with $CO_2$ via a controlled Hydrothermal Liquid Phase Sintering (HLPS) process to create bonding elements that hold together the various components of the composite material. For example, in preferred embodiments, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS, carbonatable calcium silicate-based cements, carbonation and formation of bonding elements, apparatus and processes thereof, and related topics can be found in U.S. Pat. No. 8,114,367, U.S. Pub. No. US 2009/0143211 (application Ser. No. 12/271, 566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application Ser. No. 14/045,758), U.S. Pub. No. 2015/0266778 (application Ser. No. 14/045,519), U.S. Pub. No. 2014/0127458 (application Ser. No. 14/045,766), U.S. Pub. No. 2014/0342124 (application Ser. No. 14/045,540), U.S. Pub. No. 2014/0272216 (application Ser. No. 14/207,413), U.S. Pub. No. 2014/0263683 (application Ser. No. 14/207,421), U.S. Pat. Publ. No. 2014/0314990 (Application Ser. No. 14/207,920), U.S. Pat. No. 9,221,027 (application Ser. No. 14/209,238), U.S. Pub. No. 2014/0363665 (application Ser. No. 14/295,601), U.S. Pub. No. 2014/0361471 (application Ser. No. 14/295, 402), U.S. Pub. No. 2016/0355439 (application Ser. No. 14/506,079), U.S. Pub. No. 2015/0225295 (application Ser. No. 14/602,313), U.S. Pub. No. 2015/0056437 (application Ser. No. 14/463,901), U.S. Pub. No. 2016/0168720 (application Ser. No. 14/584,249), U.S. Pub. No. 2015/0336852 (application Ser. No. 14/818,629), U.S. Pub. No. 2016/0031757 (application Ser. No. 14/817,193), U.S. Pub. No. 2016/0272544 (application Ser. No. 15/074,659), U.S. Pub. No. 2016/0096773 (application Ser. No. 14/874,350), U.S. Pub. No. 2016/0340261 (application Ser. No. 14/715,497), U.S. Pub. No. 2016/0272545 (application Ser. No. 15/074, 692), U.S. Pub. No. 2017/0102373 (application Ser. No. 15/290,328), U.S. Pub. No. 2017/0121223 (application Ser. No. 15/335,520), U.S. Pub. No. 2017/0204010 (application Ser. No. 15/409,352), U.S. Pub. No. 2017/0253530 (application Ser. No. 15/449,736), U.S. Pub. No. 2017/0260096 (application Ser. No. 15/451,344), U.S. Pub. No. 2017/0320781 (application Ser. No. 15/587,705), U.S. application Ser. No. 15/609,908, filed May 31, 2017, U.S. application Ser. No. 15/716,392, filed Sep. 26, 2017, each of which is expressly incorporated herein by reference in its entirety for all purposes.

Bonding Elements

The carbonation process produces a carbonated composite material that microscopically includes a plurality of bonding elements having one or more types of microstructure. Collectively, the plurality of bonding elements forms an inter-connected bonding matrix creating bonding strength and holding the composite material. For example, the microstructured bonding elements may be: a bonding element comprising a core of an unreacted carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich rim of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich rim of varying thickness that is fully or partially encased by $CaCO_3$ particles; a bonding element comprising particles of partially reacted calcium silicate without a distinct core and silica rim encased by $CaCO_3$ particles; and a bonding element comprising porous particles without a distinct silica rim encased by $CaCO_3$ particles.

The silica rich rim generally displays a varying thickness within a bonding element and from bonding element to bonding element, typically ranging from about 0.01 μm to about 50 μm. In certain preferred embodiments, the silica rich rim has a thickness ranging from about 1 μm to about 25 μm. As used herein, "silica rich" generally refers to a silica content that is significant among the components of a material, for example, silica being greater than about 50% by volume. The remainder of the silica rich rim is comprised largely of $CaCO_3$, for example 10% to about 50% of $CaCO_3$ by volume. The silica rich rim may also include inert or unreacted particles, for example 10% to about 50% of melilite by volume. A silica rich rim generally displays a transition from being primarily silica to being primarily $CaCO_3$. The silica and $CaCO_3$ may be present as intermixed or discrete areas.

The silica rich rim is also characterized by a varying silica content from bonding element to bonding element, typically ranging from about 50% to about 90% by volume (e.g., from about 60% to about 80%). In certain embodiments, the silica rich rim is generally characterized by a silica content ranging from about 50% to about 90% by volume and a $CaCO_3$ content ranging from about 10% to about 50% by volume. In certain embodiments, the silica rich rim is characterized by a silica content ranging from about 70% to about 90% by volume and a $CaCO_3$ content ranging from about 10% to about 30% by volume. In certain embodiments, the silica rich rim is characterized by a silica content ranging from about 50% to about 70% by volume and a $CaCO_3$ content ranging from about 30% to about 50% by volume.

The silica rich rim may surround the core to various degrees of coverage anywhere from about 1% to about 99% (e.g., about 10% to about 90%). In certain embodiments, the silica rich rim surrounds the core with a degree of coverage less than about 10%. In certain embodiments, the silica rich rim of varying thickness surrounds the core with a degree of coverage greater than about 90%.

A bonding element may exhibit any size and any regular or irregular, solid or hollow morphology, which may be favored one way or another by raw materials selection and the production process in view of the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

The plurality of bonding elements may have any suitable mean particle size and size distribution dependent on the desired properties and performance characteristics of the composite product. In certain embodiments, for example, the plurality of bonding elements have a mean particle size in the range of about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

The inter-connected network of bonding elements (a bonding matrix) may also include a plurality of coarse or fine filler particles that may be of any suitable material, have any suitable particle size and size distribution. In certain preferred embodiments, for example, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, fly ash, calcium carbonate-rich material and magnesium carbonate-rich material.

In certain embodiments, the plurality of filler particles has a mean particle size in the range from about 5 μm to about 7 mm (e.g., about 5 μm to about 5 mm, about 5 μm to about 4 mm, about 5 μm to about 3 mm, about 5 μm to about 2 mm, about 5 μm to about 1 mm, about 5 μm to about 500 μm, about 5 μm to about 300 μm, about 20 μm to about 5 mm, about 20 μm to about 4 mm, about 20 μm to about 3 mm, about 20 μm to about 2 mm, about 20 μm to about 1 mm, about 20 μm to about 500 μm, about 20 μm to about 300 μm, about 100 μm to about 5 mm, about 100 μm to about 4 mm, about 100 μm to about 3 mm, about 100 μm to about 2 mm, about 100 μm to about 1 mm).

The weight ratio of bonding elements to filler particles may be any suitable ratios dependent on the intended application for the composite material product. For example, the weight ratio of bonding elements to filler particles may be in the range from about (50 to 99):about (1 to 50), e.g., from about (60 to 99):about (1 to 40), from about (80 to 99):about (1 to 20), from about (90 to 99):about (1 to 10), from about (50 to 90):about (10 to 50), from about (50 to 70):about (30 to 50). In certain embodiments depending on the application, the weight ratio of bonding elements to filler particles may be in the range from about (10 to 50):about (50 to 90), e.g., from about (30 to 50):about (50 to 70), from about (40 to 50):about (50 to 60).

Additional background discussions and examples of curing systems and related topics may be found in U.S. Pat. No. 9,221,027, U.S. Pub. No. 2015/0225295 (application Ser. No. 14/602,313), U.S. Pub. No. 2015/0336852 (application Ser. No. 14/818,629), U.S. Pub. No. 2017/0102373 (application Ser. No. 15/290,328), each of which is expressly incorporated herein by reference in its entirety for all purposes.

Applicant's disclosure is described herein in preferred embodiments with reference to the FIGs, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

Compositions and Method to Improve the Strength Development of Calcium Silicate-Based Cements and Concretes The invention provides novel compositions of carbonatable calcium silicate-based cements and concretes and methods for improving strength development of calcium silicate-based cements and concretes.

In another aspect, the cement of the invention enables to produce a concrete product comprising:

the cement product of the invention, wherein the cement product is cured with a greenhouse gas comprising carbon dioxide to produce a structure comprising of a core, wherein the core comprises of a portion of the unreacted calcium silicate particle;

a silica-rich layer covering at least a portion of the surface of the core; and an exterior layer covering at least a portion of the silica-rich first layer, wherein, the exterior layer comprises calcium carbonate.

In another aspect, the cement of the composition is non-hydraulic.

In one aspect, the invention provides calcium-silicate based cement compositions comprising a plurality of calcium silicate cement particles, a first additive, optionally a second additive.

These improvements are achieved through the use of specific additives, included during the preparation of the cement or the concrete compositions.

Preferably, the cement compositions comprise a plurality of carbonatable calcium silicate cement particles, a first additive and a second additive.

The first additive is an organic molecule with at least one primary, secondary or tertiary amine group.

Preferably, the first additive is an organic molecule with at least one primary, secondary or tertiary amine group comprising at least one hydroxy group.

More preferably, the first additive is one or a combination of one or more hydroxyalkylamine(s) that has a maximum molar weight of 1000 g/mol.

In some embodiments, the first additive is an organic molecule having at least one primary, secondary or tertiary amine group and at least two hydroxy groups.

In some embodiments, the first additive is an organic molecule having at least one primary, secondary or tertiary amine group and at least three hydroxy groups.

In some embodiments, the first additive is selected from the group consisting of N,N bis-(2-hydroxyethyl)-2-propanolamine) (DIEPA), N,N bis-(2-hydroxypropyl)-N-(hydroxyethyl) amine (EDIPA), diethanolamine (DEA), triethanolamine (TEA), triisopropanolamine (TIPA), triethylenetetramine (TETA), triethylenepentamine (TEPA), hydroxyethyldiethylenetriamine (HEDETA), and aminoethylethanolamine (AEEA) or a combination thereof.

Preferably, the first additive is selected from the group consisting of N,N bis-(2-hydroxyethyl)-2-propanolamine) (DIEPA), triethanalomine (TEA), triisopropanolamine (TIPA) or a combination thereof.

More preferably, the first additive is selected from the group consisting of triethanalomine (TEA), triisopropanolamine (TIPA) or a combination thereof.

Even more preferably, the first additive is TEA.

Preferably, the quantity of the first additive in the cement compositions of the invention is comprised between 0.1 wt. % and 5.0 wt. % of the amount of cement, more preferably between 0.1 wt. % and 2.0 wt. % of the amount of cement.

Advantageously, the quantity of the first additive in the cement compositions of the invention is comprised between 0.1 wt. % and 0.5 wt. % of the amount of cement; between 0.1 wt. % and 0.8 wt. % of the amount of cement; between 0.1 wt. % and 1 wt. % of the amount of cement; between 0.1 wt. % and 2 wt. % of the amount of cement; between 0.1 wt. % and 5 wt. % of the amount of cement; between 0.2 wt. % and 0.5 wt. % of the amount of cement; between 0.2 wt. % and 0.8 wt. % of the amount of cement; between 0.2 wt. % and 1.0 wt. % of the amount of cement; between 0.2 wt. % and 2.0 wt. % of the amount of cement; between 0.2 wt. % and 5.0 wt. % of the amount of cement; between 0.5 wt. % and 0.8 wt. % of the amount of cement; between 0.5 wt. % and 1.0 wt. % of the amount of cement; between 0.5 wt. % and 2.0 wt. % of the amount of cement; between 0.5 wt. % and 5.0 wt. % of the amount of cement; between 1.0 wt. % and 2.0 wt. % of the amount of cement; between 1.0 wt. % and 5.0 wt. % of the amount of cement; or between 2.0 wt. % and 5.0 wt. % of the amount of cement.

In some embodiments, the second additive is a source of calcium sulfate.

Preferably, the second additive includes gypsum.

Preferably, the quantity of the second additive in the cement compositions of the invention is comprised between 0.01 wt. % and 15.0 wt. % of the amount of cement.

More preferably, the quantity of the second additive in the cement compositions of the invention is at least of 0.05%, 0.1%, 1%, 1.5%.

More preferably, the quantity of the second additive in the cement compositions of the invention is less than 10%, 5%.

In another aspect, the invention relates to a method to increase strength of calcium silicate-based materials comprising the addition of the first and potentially the second additive during or after the grinding of a calcium silicate-based cement or during the mixing of the cement with a plurality of aggregate particles to form a concrete composition.

In one embodiment, this method to increase strength of calcium silicate-based materials has the following steps:

1. the first and potentially the second additive are added prior, during or after the grinding of a calcium silicate-based cement;

2. this calcium silicate-based composition is mixed with a plurality of aggregate particles to form a concrete composition;

3. the concrete composition has a plurality of pores and is carbonated using a greenhouse gas that contains carbon dioxide.

Preferably, the quantity of first additive in the first step is comprised between 0.1 wt. % and 2.0 wt. % of the amount of cement.

Preferably, the quantity of second additive in the first step is comprised between 0.01 wt. % and 15.0 wt. % of the amount of cement.

More preferably, the quantity of the second additive is at least of 0.05%, 0.1%, 1%, 1.5%.

More preferably, the quantity of the second additive is less than 10%, 5%.

Preferably, this embodiment of a method to increase strength of calcium silicate-based materials has the following steps:

1. the first and the second additives are added prior, during or after the grinding of a calcium silicate-based cement;

2. this calcium silicate-based composition is mixed with a plurality of aggregate particles to form a concrete composition;

3. the concrete composition has a plurality of pores and is carbonated using a greenhouse gas that contains carbon dioxide.

More preferably, this embodiment of a method to increase strength of calcium silicate-based materials has the following steps:

1. TEA and gypsum are added prior, during or after the grinding of a calcium silicate-based cement;

2. this calcium silicate-based composition is mixed with a plurality of aggregate particles to form a concrete composition;

3. the concrete composition has a plurality of pores and is carbonated using a greenhouse gas that contains carbon dioxide.

Preferably, the quantity of TEA in the first step is comprised between 0.1 wt. % and 2.0 wt. % of the amount of cement.

Preferably, the quantity of gypsum in the first step is comprised between 0.01 wt. % and 15.0 wt. % of the amount of cement.

More preferably, the quantity of gypsum is at least of 0.05%, 0.1%, 1%, 1.5%.

More preferably, the quantity of gypsum is less than 10%, 5%.

In another embodiment, this method to increase strength of calcium silicate-based materials, has the following steps:

1. a calcium silicate-based cement is mixed with a plurality of aggregate particles to form a concrete composition;

2. the first and potentially the second additive are added prior or during the mixing of the cement and the plurality of aggregate particles;

3. the resulting concrete composition has a plurality of pores and are carbonated using a greenhouse gas that contains carbon dioxide.

Preferably, the quantity of first additive in the first step is comprised between 0.1 wt. % and 2.0 wt. % of the cement content.

Preferably, the quantity of second additive in the first step is comprised between 0.01 wt. % and 15.0 wt. % of the amount of cement.

More preferably, the quantity of the second additive is at least of 0.05%, 0.1%, 1%, 1.5%.

More preferably, the quantity of the second additive is less than 10%, 5%.

Preferably, this embodiment of a method to increase strength of calcium silicate-based materials has the following steps:

1. a calcium silicate-based cement is mixed with a plurality of aggregate particles to form a concrete composition;

2. the first and the second additives are added prior or during the mixing of the cement and the plurality of aggregate particle;

3. the resulting concrete composition has a plurality of pores and are carbonated using a greenhouse gas that contains carbon dioxide.

More preferably, this embodiment of a method to increase strength of calcium silicate-based materials has the following steps:

1. a calcium silicate-based cement is mixed with a plurality of aggregate particles to form a concrete composition;

2. TEA and gypsum are added prior or during the mixing of the cement and the plurality of aggregate particle;

3. the resulting concrete composition has a plurality of pores and are carbonated using a greenhouse gas that contains carbon dioxide.

Preferably, the quantity of TEA in the second step is comprised between 0.1 wt. % and 2.0 wt. % of the amount of cement.

Preferably, the quantity of gypsum in the second step is comprised between 0.01 wt. % and 15.0 wt. % of the amount of cement.

More preferably, the quantity of the second additive is at least of 0.05%, 0.1%, 1%, 1.5%.

More preferably, the quantity of the second additive is less than 10%, 5%.

In another embodiment, this method to increase strength of calcium silicate-based materials, has the following steps:

1. grinding of a calcium silicate-based cement;

2. mixing of the cement with a plurality of aggregate particles to form a concrete composition; wherein one of the two additives is added prior, during or after the grinding of the calcium silicate-based cement and the other is added prior or during the mixing of the cement and the plurality of aggregate particles;

3. the resulting concrete composition has a plurality of pores and are carbonated using a greenhouse gas that contains carbon dioxide.

Preferably, the quantity of first additive is comprised between 0.1 wt. % and 2.0 wt. % of the cement content.

Preferably, the quantity of second additive is comprised between 0.01 wt. % and 15.0 wt. % of the amount of cement.

More preferably, the quantity of the second additive is at least of 0.05%, 0.1%, 1%, 1.5%.

More preferably, the quantity of the second additive is less than 10%, 5%.

Preferably, this embodiment of a method to increase strength of calcium silicate-based materials has the following steps:

1. grinding of a calcium silicate-based cement;
2. mixing of the cement with a plurality of aggregate particles to form a concrete composition; wherein one of TEA or gypsum is added prior, during or after the grinding of the calcium silicate-based cement and the other is added prior or during the mixing of the cement and the plurality of aggregate particles;
3. the resulting concrete composition has a plurality of pores and are carbonated using a greenhouse gas that contains carbon dioxide.

Preferably, the quantity of TEA in the second step is comprised between 0.1 wt. % and 2.0 wt. % of the amount of cement.

Preferably, the quantity of gypsum in the second step is comprised between 0.01 wt. % and 15.0 wt. % of the amount of cement.

More preferably, the quantity of gypsum is at least of 0.05%, 0.1%, 1%, 1.5%.

More preferably, the quantity of gypsum is less than 10%, 5%.

The invention also provides a concrete product comprising:

the cement product of the invention, wherein the cement product is cured with a greenhouse gas comprising carbon dioxide to produce a structure comprising of a core, wherein the core comprises of a portion of the unreacted calcium silicate particle;

a silica-rich layer covering at least a portion of the surface of the core; and an exterior layer covering at least a portion of the silica-rich first layer, wherein, the exterior layer comprises calcium carbonate;

and a plurality of aggregate particles.

The invention also provides a method for preparing a concrete product comprising:

mixing the cement according to the invention with a plurality of aggregate particles to form a concrete product having a plurality of pores;

placing and forming the concrete product in molds;

curing the formed concrete product with a greenhouse gas comprising carbon dioxide to produce a structure comprising of a core, wherein the core comprises a portion of the unreacted carbonatable calcium silicate particle;

a silica-rich layer covering at least a portion of the surface of the core; and an exterior layer covering at least a portion of the silica-rich first layer, wherein, the exterior layer comprises calcium carbonate.

The invention also provides a carbonatable composition comprising:

Calcium silicate;

One or more discrete calcium silicate phases selected from CS (wollastonite or pseudowollastonite), C3S2 (rankinite), C2S (belite, larnite, bredigite), and an amorphous calcium silicate phase at about 30%> or more by mass of the total phases; and calcium aluminate accounting for about 0.1% to about 2.5% by weight of the carbonatable composition, wherein elemental Ca and elemental Si are present in the composition at a molar ratio from about 0.8 to about 1.2; and metal oxides of Al, Fe and Mg are present in the composition at about 30% or less by mass;

the first and the second additives, preferably TEA and gypsum.

Preferably, the carbonatable composition of the invention is suitable for carbonation with $CO_2$ at a temperature of about 30° C. to about 90° C. to form $CaCO_3$ with a mass gain of about 10% or more.

EXAMPLES

Carbonatable Calcium Silicate-Based Cement Compositions

In the following examples, one cement is used: Cement 1. Its chemical composition is provided in table 1 below.

| | Range of compositions |
|---|---|
| LOI (%) | 0 to 2 |
| $SiO_2$ (%) | 30 to 55 |
| $Al_2O_3$ (%) | 1 to 8 |
| $Fe_2O_3$ (%) | 0.1 to 5 |
| CaO (%) | 40 to 55 |
| MgO (%) | 0.1 to 2.5 |
| $SO_3$ (%) | 0.01 to 10 |
| $Na_2O$ (%) | 0.01 to 0.5 |
| $K_2O$ (%) | 0.1 to 2 |
| $TiO_2$ (%) | 0.01 to 0.5 |
| $P_2O_5$ (%) | 0.01 to 1 |
| $Mn_2O_3$ (%) | 0.01 to 0.5 |

Concrete Composition and Mixing Procedure

The following concrete compositions were used to assess strength development.

TABLE 2

| Concrete component | Weight (g) |
|---|---|
| Cement 1 | 417.3 |
| Gypsum | 73.6 |
| Normalised sand 0/2 | 1350 |
| TEA | 2.5 |
| Water | 186.5 |

The concrete compositions were prepared in a Perrier mixer, and cast in 4×4×16 cm molds, using a vibrating table. The mixing procedure was the following:

1. Mixing of all the solid components with the sand during 1 min at slow speed
2. Adding water during 30 seconds
3. Mixing another 1 min at slow speed
4. Stopping the mixing and scraping of the material on the side of the mixing bowl for 1 minute
5. Mixing at slow speed for 30 seconds
6. Mixing at fast speed for another 30 seconds.

TEA was diluted in the water, and the samples were vibrated 2 minutes in the molds. The samples were left at room temperature for 15 hours before being demolded. The samples were then carbonated at 70° C. for 24 h or 48 h, after which the compression strength was measured.

Example 1

Effect of Substitution of 4 wt. % of Cement by Gypsum

A control concrete is compared to a concrete where 4 wt. % of the cement is replaced by gypsum. The results, given in the table below, show that gypsum addition strongly increases strength.

TABLE 3

| Binder composition in used in the concrete | Compressive strength after 48 hours carbonation at 70° C. |
|---|---|
| 100 wt. % Cement 1 | 66 MPa |
| 96 wt. % Cement 1 and 4 wt. % gypsum | 75 MPa |

Example 2

Effect of Calcium Chloride and TEA on Strength

In the following example, the same concrete composition is used with different cement compositions. Cement 1 is first compared to a cement composed to 96 wt. % Cement 1 and 4 wt. % gypsum. To this last cement composition, calcium chloride and TEA are added.

The results given in the table below show the synergistic effect of the combination of TEA and gypsum on strength development: the final strength is then higher that when Cement 1 is used without diluting it with gypsum.

TABLE 4

| Binder composition in used in the concrete | Compressive strength after 24 hours carbonation at 70° C. |
|---|---|
| 100 wt. % Cement 1 | 58 MPa |
| 100 wt. % Cement 1 with another 0.5 wt. % TEA | 69 MPa |
| 96 wt. % Cement 1 and 4 wt. % gypsum | 50 MPa |
| 96 wt. % Cement 1 and 4 wt. % gypsum, with another 0.5 wt. % of calcium chloride | 41 MPa |
| 96 wt. % Cement 1 and 4 wt. % gypsum, with another 0.5 wt. % TEA | 71 MPa |

Example 3

Effect of Gypsum Content in the Cement Composition

The following example was prepared by using different binders where Cement 1 is replaced by gypsum, in the same concrete composition as provided above. The concretes are carbonated for 24 hours at 70° C.

The results, visible in FIG. 1, show that in the presence of TEA, there is a preferred gypsum content that corresponds to a binder composed of approximated 97 wt. % of Cement 1 cement and 3 wt. % gypsum. In an exemplary composition, the maximum strength achieved is 77 MPa. Interestingly, without TEA, the addition of gypsum results in a reduced strength. These results further highlight the synergetic effect between TEA and gypsum.

Example 4

Effect of TIPA in the Place of TEA

In the following example, the same concrete composition is used with different amino-alcohol source compositions. Cement 1 ref. mix is compared to a cement composed of 100 wt. % Cement 1 containing 2 wt. % gypsum and another 0.5 wt. % of TIPA or TEA.

The results given in the table below show that the invention may be implemented by other source of amino-alcohol than TEA. Although the TEA and TIPA binders comprise the same mass of TEA and TIPA, it may be noted that in molar the binders comprise more TEA (0.016 mol) than TIPA (0.013 mol), which may explain the difference of reactivity.

TABLE 5

| Batch | % GM | Compressive strength after 48 hours carbonation at 70° C. |
|---|---|---|
| 100 wt. % Cement 1 ref. mix | 23.5 | 53 MPa |
| 100 wt. % Cement 1 containing 2 wt. % gypsum and another 0.5 wt. % TEA | 23.5 | 69 MPa |
| 100 wt. % Cement 1 containing 2 wt. % gypsum and another 0.5 wt. % TIPA | 23.0 | 61 MPa |

The invention claimed is:

1. A concrete product comprising:
a cement product, wherein the cement product comprises a plurality of particles of a carbonatable calcium silicate cement and a first additive, wherein the first additive is an organic molecule with at least one primary, secondary or tertiary amine group, and a second additive wherein, the second additive is a source of calcium sulfate,
wherein the cement product is cured with a gas comprising carbon dioxide to produce a structure comprising of a core, wherein the core comprises a portion of unreacted calcium silicate particle; a silica-rich layer covering at least a portion of the surface of the core; and an exterior layer covering at least a portion of the silica-rich first layer, wherein the exterior layer comprises calcium carbonate; and
a plurality of aggregate particles.

2. The concrete product of claim 1, wherein, the first additive is an organic molecule with at least one primary, secondary or tertiary amine group comprising at least one hydroxy group.

3. The concrete product of claim 2, wherein, the first additive is one or a combination of one or more hydroxyalkylamine(s) that has a maximum molar weight of 1000 g/mol.

4. The concrete product of claim 3, wherein, the first additive is selected from the group consisting of N,Nbis-(2-hydroxyethyl)-2-propanolamine) (DI EPA), N, Nbis-(2-hydroxypropyl)-N-(hydroxyethyl) amine (EDIPA), diethanolamine (DEA), triethanolamine (TEA), triisopropanolamine (TIPA), triethylenepentamine (TEPA), hydroxyethyldiethylenetriamine (HEDETA) and aminoethylethanolamine (AEEA) or a combination thereof.

5. A method for preparing a concrete product comprising:
mixing a cement product with a plurality of aggregate particles to form a concrete product having a plurality of pores, wherein the cement product comprises a plurality of particles of a carbonatable calcium silicate cement and a first additive, wherein the first additive is an organic molecule with at least one primary, secondary or tertiary amine group;

placing and forming the concrete product in molds;

curing the formed concrete product with a gas comprising carbon dioxide to produce a structure comprising a core, wherein the core comprises of a portion of unreacted carbonatable calcium silicate particle;

a silica-rich layer covering at least a portion of the surface of the core; and an exterior layer covering at least a portion of the silica-rich first layer, wherein the exterior layer comprises calcium carbonate.

6. A carbonatable composition comprising:

one or more discrete calcium silicate phases selected from CS (wollastonite or pseudowollastonite), C3S2 (rankinite), C2S (belite, larnite, bredigite), and an amorphous calcium silicate phase at about 30% or more by mass of the total phases; and calcium aluminate accounting for about 0.1% to about 2.5% by weight of the carbonatable composition, wherein elemental Ca and elemental Si are present in the composition at a molar ratio from about 0.8 to about 1.2; and metal oxides of Al, Fe and Mg are present in the composition at about 30% or less by mass, first and the second additives, wherein the first additive is an organic molecule with at least one primary, secondary or tertiary amine group, and the second additive is a source of calcium sulfate.

7. The carbonatable composition of claim 6, wherein the first and second additives are triethanolamine and gypsum.

* * * * *